Jan. 15, 1957  E. W. BAILEY  2,777,290
SPHERICAL INTERNAL COMBUSTION TURBINE
Filed Aug. 8, 1955

EDWARD W. BAILEY
INVENTOR.

BY *Herbert J. Brown*

ATTORNEY

United States Patent Office
2,777,290
Patented Jan. 15, 1957

2,777,290

SPHERICAL INTERNAL COMBUSTION TURBINE

Edward W. Bailey, Fort Worth, Tex.

Application August 8, 1955, Serial No. 526,936

4 Claims. (Cl. 60—39.35)

This invention relates to turbines and has reference to a new and useful construction therefore including an integral arrangement of turbine vanes and combustion chambers.

An object of the invention is to provide a gas turbine engine capable of operation at relatively high efficiency.

A further object of the invention is to provide a gas turbine engine deriving motive power from a revolving combustion chamber for attaining increased efficiency.

Another object of the invention is to provide a gas turbine engine for advantageously utilizing curvilinear components in the conversion of gaseous combustion into useful power.

A particular object of the invention is to provide simplified means of carburetion for a gas turbine engine which employs centrifugal forces to vaporize a liquid fuel.

An additional object of the invention is to provide efficient centrifugal means for dispersal of air for combustion within a combustion chamber of a gas turbine engine.

Still another object of the invention is to provide, in a gas turbine engine, means for maintaining continuous compression within a rotating combustion chamber.

Another object of the invention is to provide power extracting means integral with a rotating combustion chamber of a gas turbine engine.

These and other objects will become apparent from the following description and the accompanying drawing, wherein.

Figure 2:
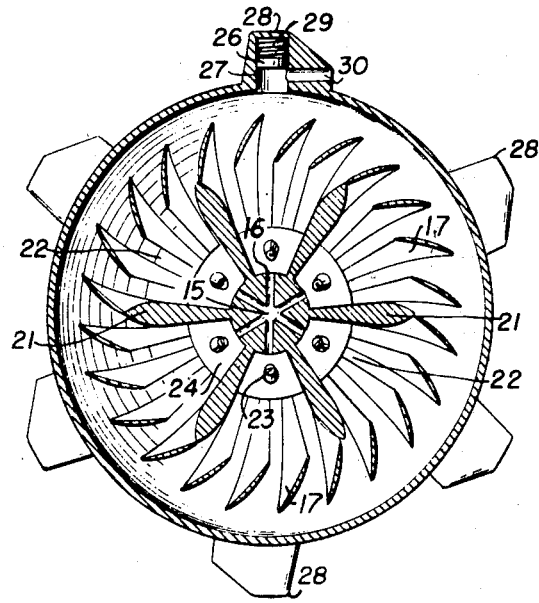
Figure 2 is a sectional view of the invention taken along the line 2—2 of Figure 1.
Figure 1:
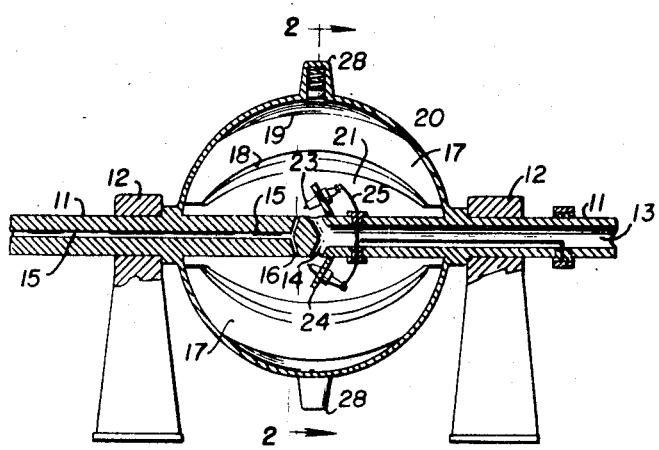
Figure 1 is a side elevational and sectional view of a gas turbine engine in accordance with the invention.

The invention consists, primarily, of a spherical housing enclosing integral vanes within combustion chambers. Fuel and air for combustion are conducted into the combustion chambers through axial openings within an axle.

In the drawing, a shell like spherical housing 10 is constructed of a heat tolerant ferroalloy such as molybdenum steel. The walls of the spherical housing 10 are of contiguous air tight construction on the order of one thousand pounds per square inch. An axle 11 passes through the center of the spherical housing 10 as defined by its arcuate surfaces and extends exteriorly from points of attachment on opposite sides thereof. Exterior portions of the axle 11 are journaled through vertical bearing supports 12 at opposite sides of the spherical housing 10. A cylindrical opening 13 disposed coaxially within the axle 11 is provided to conduct air into the spherical housing 10 and extends from one end of the axle to a point within the spherical housing near the center thereof. The walls of the cylindrical opening 13 are provided with helical grooves 13a or rifling. At the termination of the cylindrical opening 13 within the spherical housing 10 a plurality of air passages 14 are radially disposed about the cylindrical opening. Each air passage 14 communicates between the cylindrical opening 13 and the interior of the spherical housing 10. A second cylindrical opening 15 disposed coaxially within the axle 11 is provided to conduct fuel into the cylindrical housing and extends from the other end of the axle to a point within the spherical housing near its center. The second cylindrical opening 15 is provided with helical grooves 15a or rifling within its walls. At the termination of the second cylindrical opening 15 within the spherical housing 10 a number of fuel passages 16, corresponding to the number of air passages 14, are radially disposed. Each fuel passage 16 communicates between the second cylindrical opening 15 and the interior of the spherical housing 10. The diameters of the first cylindrical opening 13 and the air passages 14 are larger than the diameters of the second cylindrical opening and the fuel passages 16 respectively. The terminations of the two cylindrical openings 13 and 15 are spaced from one another within the axle 11 so that there is no communication therebetween. Each fuel passage is in radial alignment with an air passage about the axis of the axle 11.

A plurality of metal vanes 17, regularly spaced from one another, are positioned within the spherical housing where each vane extends between points of attachment on the interior surface of opposite walls of the spherical housing 10 with said points of attachment for each vane 17 being in a plane of the axis of the axle. The ends of each vane 17 are spaced from the axle, and the inner and outer edges 18 and 19 of each vane are formed arcuately and outward with respect to the axle 11. The surfaces of the vanes 17 lying between the inner and outer edges 18 and 19 thereof are obliquely dispersed with reference to planes of the axis of the axle intersecting therewith. The surfaces of the vanes 17 are concavely formed with reference to the center of the spherical housing 10. The vanes are constructed of heat tolerant metal such as molybdenum steel. Metal plates 21, also made of heat tolerant material, project radially from the axle 13 and are disposed within the spherical housing 10 in planes of the axis of the axle. The number of metal plates corresponds to the number of air or fuel passages 14 and 16, and each metal plate is attached to the surface of the axle 11 on a line running parallel to the axis of the axle equidistantly between adjacent orifices of fuel passages or air passages. That edge of each metal plate joined to the axle is coextensive therewith between opposite walls of the spherical housing. The outer edge of each metal plate is joined to the inner edge of an adjacent vane. The thickness of the metal plates increases outwardly from the axle in wedge like progression, but the outer portion of each vane is tapered so that the thickness of each outer edge thereof corresponds to the thickness of the vanes. Areas within the spherical housing and between the metal plates 21 constitute combustion chambers 22.

Spark plugs 23 are held within the spherical housing by brackets 24 attached to the axle 11. While the housing 10 and axle 11 are shown to be integral, the structure illustrated may be welded and the spark plugs may be installed before welding the housing to the axle. The spark gap of each spark plug 23 is positioned within a combustion chamber 22 at the point where streams of fuel and air emerging from the passages 14 and 16 intersect therein. The axle 11 and brackets 24 serve as common electrical conductors for the spark plugs 23, and an insulated electrical conductor 25 extends from the head of each spark plug into the cylindrical opening 13 and thence to a conventional electrical contact brush mounted on but insulated from the axle at the exterior of the spherical housing.

Exhaust valves for each combustion chamber are positioned on the exterior surface of the spherical housing. The valves are of the pressure operated piston type each having a cylindrical piston 26 slidably positioned with a cylinder 27. The cylinder 27 is enclosed by a valve housing 28 and communicates with the interior of the spherical housing 10. A coil spring 29 is positioned within the outer portion of cylindrical chamber 27 and is compressed between the outer end of the cylindrical chamber and the piston 26. An exhaust outlet opening 30 extends between a wall of the cylindrical chamber 27 and the exterior of the spherical housing 10 in communication therebetween through the valve housing 28.

In operation, air is forced under pressure by any suitable auxiliary means through the cylindrical opening 13 in the axle 11. The rifling within the opening 13 imparts rotation to the stream of air flowing therethrough and imparts centrifugal tendencies to the stream of air which tend to accelerate the flow of air through the passages 14 into the combustion chambers 22 and to promote agitation within the combustion chambers. Fuel, such as gas, gasoline or kerosene, is forced by suitable auxiliary means through the cylindrical opening 15. Rotation of the stream of fuel by rifling 15a within the chamber 15 tends to accelerate the flow of fuel through the fuel passages 16 and to the combustion chambers 22. Pressure from the coil springs 29 depresses the pistons 26 with cylinders 29 so that the walls of the pistons obstruct communication between the exhaust outlets 30 and the interior of the spherical housing 10, thus maintaining compression therein. The streams of air and fuel from the air and fuel passages 14 and 16 mix within the combustion chambers 22 and are ignited by the spark plugs 23. Forces from the particles of combustion impinge upon the vanes 17 and transmit tangential forces thereto which cause the spherical housing 10 and its rigidly connected axle 11 to rotate on the bearing supports 12. Pressure of combustion causes the pistons 26 to slide outwardly within the cylinders 27 against the tension of the springs 29 so that the interior of the spherical housing 10 communicates with the exhaust outlet 30. Each exhaust outlet 30 extends from its cylinder 27 in a direction opposite the rotation of the spherical housing so that forces of reaction therefrom further promote the rotation of the spherical housing 10.

The invention is not limited to the exemplary construction herein shown and described, but may be made in many ways within the scope of the appended claims.

What is claimed is:

1. A turbine engine comprising a spherical housing, an axle passing through the center of said housing and projecting exteriorly from opposite sides thereof, said housing being fixed to said axle to rotate therewith, a cylindrical opening coaxially disposed within said axle and extending from one end thereof to a point within said housing for conducting air into the interior of said housing, another cylindrical opening coaxially disposed within said axle and extending from the other end thereof to a point within said housing for conducting fuel into the interior of said housing, a plurality of radially disposed air passages communicating between said first cylindrical opening and the interior of said housing, a plurality of radially disposed fuel passages communicating between said second cylindrical opening and the interior of said housing, a plurality of metal plates continuously connected to said axle between opposite walls of said housing and radially projecting from said axle therein, angularly set vanes extending between opposite interior walls of said housing and equally spaced from one another, pressure operated valves attached to the exterior of said housing and communicating between the interior and the exterior thereof, and means of ignition positioned within said housing.

2. The invention as defined in claim 1 and wherein the outer termination of said metal plates are joined to the inner edges of adjacent vanes.

3. The invention as defined in claim 2 and wherein said cylindrical openings are provided with helical grooves in their walls.

4. The invention as defined in claim 3, wherein the exhaust outlets of said pressure operated valves extend longitudinally opposite the direction of rotation of the invention.

References Cited in the file of this patent
UNITED STATES PATENTS
1,003,708   Coleman _____ Sept. 19, 1911